3,806,318
APPARATUS FOR STERILIZING
COMPRESSED AIR
Michel Siard, Sainte Adresse, and Daniel Pellerin, Le Havre, France, assignors to Societe Anonyme dite Compagnie Francaise de Raffinage, Paris, France
Filed Apr. 1, 1971, Ser. No. 130,326
Claims priority, application France, April 3, 1970, 7012083
Int. Cl. A61l 9/00
U.S. Cl. 21—74 R   7 Claims

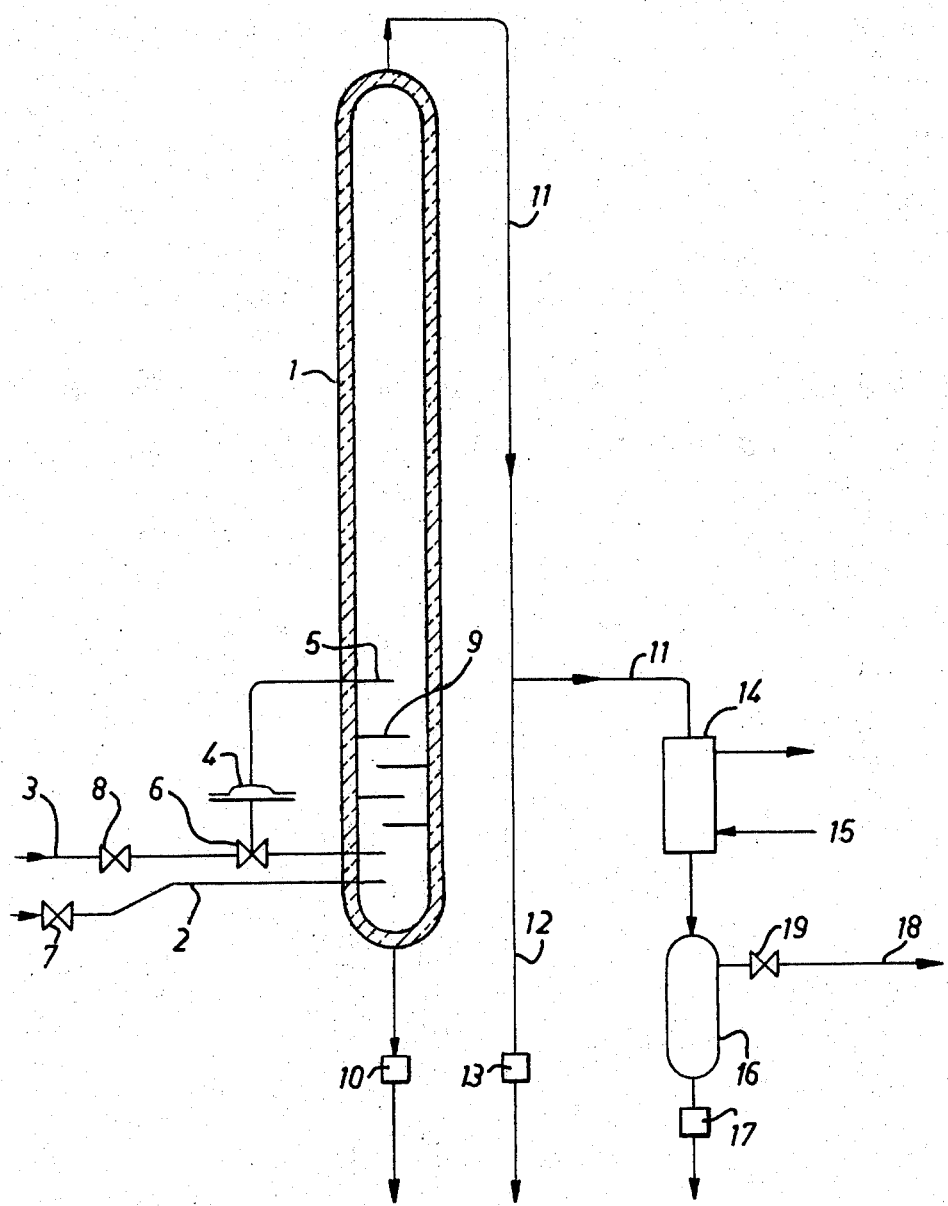

ABSTRACT OF THE DISCLOSURE

Compressed air to be sterilized is mixed with steam in a vertical enclosure, and the air is sterilized in the enclosure and discharged with the steam from the top of the enclosure. The thus sterilized air is separated from the steam first by passage of the mixture through a cooling chamber until the steam is condensed to water and then by separating of the water and air in a separator.

BRIEF SUMMARY OF THE INVENTION

The present invention relates to apparatus for the sterilization of compressed air.

The invention is applicable for the production of sterile air utilized in blow molding sterile plastic bottles.

It is known that air can be purified by filtration. However, the passage of air through a filter does no prodtuce sterile air. In fact, a filter retains the finest particles which consequently form nuclei of contamination. Also, a filter is not well adapted to the retention of liquids, which is disadvantageous when the compressed air to be sterilized contains traces of oil and water. Finally, the mounting of a filter under aseptic conditions is an extremely delicate operation.

The present invention seeks to avoid the enumerated drawbacks and to provide apparatus by which sterile air can be obtained easily.

According to the invention, compressed air and steam are mixed in an enclosure for a period and at a temperature such that the air is sterilized, whereafter the steam and the thus sterilized air are then separated.

The employment of steam in the apparatus of the invention serves a dual function, firstly it acts as a sterilizing agent and secondly as a heat conveyor.

The selected sterilization temperature is related to the volume of the enclosure, and the rate of feed of compressed air and steam, so that the contact period between these two constituents is sufficient to complete the sterilization thoroughly. It is further necessary that the pressure of the compressed air and the pressure of the steam in the enclosure be greater than the saturated vapor pressure of water at the selected sterilization temperature.

The separation of the steam and of the sterile air can be effected by simple cooling of the gaseous mixture.

BRIEF DESCRIPTION OF THE DRAWING

The sole figure of the drawing is a diagrammatic illustration of the sterilization apparatus according to the invention.

DETAILED DESCRIPTION

In the drawing is shown a heat-insulated enclosure 1 supplied with air to be sterilized via pipeline 2 and with steam via pipeline 3. A thermoregulator 4 is connected in pipeline 3 and is provided with a detector 5, which can be a thermocouple, disposed in the enclosure. The thermoregulator 4 controls a valve 6 which regulates steam flow into enclosure 1. The pipelines 2 and 3 are provided with respective valves 7 and 8.

At the bottom of the enclosure 1 are a set of baffles 9 for promoting the mixture of air and steam.

A float trap 10 is connected at the base of the tower for removal of condensate from the enclosure 1. At the top of the enclosure is a main discharge line 11, and a shunt line 12 branches from line 11 outside the enclosure. The shunt line 12 contains a thermal trap 13 which removes condensate formed during the initial temperature rise in enclosure 1 to the sterilization temperature. A cooling chamber 14 is connected in line 11 and the cooling chamber is traversed by a coolant flowing in line 15. The cooling chamber 14 serves to condense the steam mixed with the compressed air. A separator 16 is connected in line 11 downstream of cooling chamber 14 to eliminate the condensed water which is evacuated through a trap 17, while the sterile air is transferred to the point of use through line 18 furnished with a valve 19.

The apparatus operates as follows:

Valves 6 and 8 are opened and valves 7 and 19 are closed and steam is admitted into enclosure 1 until the temperature thereof reaches the sterilization temperature. Trap 13 evacuates the gaseous effluents from the enclosure.

Upon reaching sterilization temperature, the regulator 4 starts operating, and valve 19 is then opened while trap 13 is closed.

The valve 7 is then opened for the admission of air to be sterilized into enclosure 1 and the cooling system 15 is also operated. The condensates are discharged through traps 10 and 17.

The air in line 2 is at a temperature of 20° C. and a pressure of 8 bars. In line 3, the steam is at a temperature of 170° C. and pressure of 8 bars, while in enclosure 1 the temperature is regulated at 130° C. and a pressure of 7 bars.

An advantage of the apparatus according to the invention is in the capability of simple, periodic sterilization of the compressed-air circuits. For this purpose, it is sufficient to terminate the feed of coolant to cooling chamber 14, whereupon the entire circuit is then subjected to the sterilization temperature.

A further advantage of the apparatus is that the partial condensation of steam occurring in the lower portion of enclosure 1 carries along solid and liquid impurities in the supplied air whose vapor tension is low. In this way, for example, oil is evacuated with the condensate through trap 10. The cooling chamber effects a second purification of the impurities which are evacuated through trap 17. These two successive purifications effected at different temperatures allow the supply to the enclosure of unpurified or unscrubbed air.

The vertical elongate form of the enclosure results in a flow of condensates from the sterile zone back to the non-sterile zone, which is of appreciable advantage and insures the removal at the top of the enclosure of sterilized air.

What is claimed is:

1. Apparatus for sterilizing compressed air comprising a chamber, means for introducing compressed air to be sterilized into said chamber, means for introducing steam under pressure into said chamber to mix with the compressed air and sterilize the same, means for removing the mixture of air and steam from said chamber, and means for separating the thusly sterilized air from said steam, said chamber having a height substantially greater than its width so as to be vertically elongated, said chamber having inlet means for the compressed air and steam at the bottom of the chamber, a first outlet at the top of the chamber for the mixture and a second outlet at the bottom of the chamber below the level of said inlet means and a condensate trap connected to said second outlet of the chamber.

2. Apparatus as claimed in claim 1 comprising a plurality of horizontal overlapped plates superimposed vertically above one another in offset manner to define a baffle means in the bottom of the chamber above the inlet means for mixing the steam and air in said chamber.

3. Apparatus as claimed in claim 1 wherein said means for introducing steam into said chamber comprises valve means for controlling the flow of steam into said chamber and regulator means controlling said valve means and including a temperature sensing element disposed in said chamber.

4. Apparatus as claimed in claim 3 wherein said means for separating the thusly sterilized air from the steam comprises cooling means connected to the second outlet of said chamber for receiving the mixture of steam and air therefrom to cool the mixture and condense the steam to water, and separator means connected to the cooling means to separate the air from the water.

5. Apparatus as claimed in claim 4 comprising a main discharge line connecting the cooling means to the second outlet at the top of said chamber, and a shunt line with a condensate trap connected to said main line to branch therefrom at a location between the second outlet and said cooling means.

6. Apparatus as claimed in claim 5 comprising a trap connected to said separator means at the outlet thereof for the removal of water.

7. Apparatus as claimed in claim 6 comprising a valve in each of the means for introducing steam and air into the chamber, and a valve at the outlet of the separator means for the sterilized air.

References Cited

UNITED STATES PATENTS

| | | | |
|---|---|---|---|
| 1,736,839 | 11/1929 | Schiller et al. | 21—74 R |
| 2,203,188 | 6/1940 | Beer | 21—74 RX |
| 2,302,262 | 11/1942 | Schiller | 21—74 RX |
| 2,477,964 | 8/1949 | Corblin | 21—53 |
| 3,254,942 | 6/1966 | Harger et al. | 21—74 R |
| 3,510,252 | 5/1970 | Reich | 21—74 R |

FOREIGN PATENTS

| | | | |
|---|---|---|---|
| 577,362 | 6/1959 | Canada | 21—53 |

BARRY S. RICHMAN, Primary Examiner

U.S. Cl. X.R.

21—53